(12) United States Patent
Kawanai

(10) Patent No.: US 11,709,239 B2
(45) Date of Patent: Jul. 25, 2023

(54) VEHICLE CONTROL SYSTEM

(71) Applicant: Toyota Jidosha Kabushiki Kaisha, Toyota (JP)

(72) Inventor: Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 464 days.

(21) Appl. No.: 16/823,735

(22) Filed: Mar. 19, 2020

(65) Prior Publication Data

US 2020/0300991 A1 Sep. 24, 2020

(30) Foreign Application Priority Data

Mar. 22, 2019 (JP) .................. 2019-055022

(51) Int. Cl.
*G01S 7/497* (2006.01)
*G01S 17/931* (2020.01)

(52) U.S. Cl.
CPC ............ *G01S 7/497* (2013.01); *G01S 17/931* (2020.01)

(58) Field of Classification Search
CPC ......... G01S 7/497; G01S 17/931; G01S 17/42
See application file for complete search history.

(56) References Cited

U.S. PATENT DOCUMENTS

| | | | |
|---|---|---|---|
| 10,134,278 B1* | 11/2018 | Konrardy | G08G 1/165 |
| 10,583,737 B2 | 3/2020 | Chiba et al. | |
| 10,922,561 B2 | 2/2021 | Ozawa et al. | |
| 11,247,671 B2 | 2/2022 | Komori | |
| 2013/0144502 A1* | 6/2013 | Shida | B60K 31/0008 701/96 |
| 2014/0162219 A1* | 6/2014 | Stankoulov | G09B 19/167 434/65 |
| 2017/0241812 A1* | 8/2017 | Grambichler | G01D 5/247 |
| 2017/0307730 A1* | 10/2017 | Baba | B60R 21/00 |
| 2018/0113200 A1* | 4/2018 | Steinberg | G01S 7/4814 |
| 2018/0149732 A1 | 5/2018 | Droz et al. | |
| 2019/0018416 A1* | 1/2019 | Gassend | G01S 17/931 |
| 2019/0094345 A1* | 3/2019 | Singer | G01S 17/42 |
| 2019/0154816 A1* | 5/2019 | Hughes | G01S 7/497 |
| 2020/0017035 A1* | 1/2020 | Bretagnol | H04N 23/51 |
| 2022/0197285 A1* | 6/2022 | Gassend | G01S 17/931 |

FOREIGN PATENT DOCUMENTS

| | | | |
|---|---|---|---|
| JP | H11-084006 A | | 3/1999 |
| JP | 2019007892 A | * | 1/2019 |
| WO | 2018146058 A1 | | 8/2018 |

* cited by examiner

*Primary Examiner* — Timothy A Brainard
*Assistant Examiner* — Hailey R Le
(74) *Attorney, Agent, or Firm* — Dinsmore & Shohl LLP

(57) ABSTRACT

The vehicle control system comprises a vehicle speed acquisition device, a rotary-typed LIDAR and a controller. The vehicle speed acquisition device is configured to acquire traveling speed of a vehicle. The LIDAR is configured to acquire surrounding information of the vehicle using a laser beam. The controller is configured to control a rotational movement of the LIDAR. The controller is configured to execute processing to set a cycle of the rotational movement based on the traveling speed. In the setting processing, the controller is configured to set the cycle during the traveling speed is relatively fast to a longer cycle than that during the traveling speed is relatively slow.

5 Claims, 16 Drawing Sheets

VEHICLE CONTROL SYSTEM

CROSS-REFERENCE TO RELATED APPLICATION

The present application claims priority under 35 U.S.C. § 119 to Japanese Patent Application No. 2019-055022, filed Mar. 22, 2019. The contents of this application are incorporated herein by reference in their entirety.

FIELD

The present disclosure relates to a control system of a vehicle on which a LIDAR (Laser Imaging Detection and Ranging) is mounted.

BACKGROUND

US2018/0149732A discloses a LIDAR system which is mounted on a vehicle. The conventional system includes a rotary-typed LIDAR. The LIDAR includes a laser, a movable mirror, a rotating table and a photodetector. The laser emits light. The movable mirror reflects light emitted from the laser (hereinafter also referred to as "laser beam") to irradiate surrounding environment. The rotating table rotates the movable mirror. The photodetector detects the light reflected from the surrounding environment.

The conventional system further includes a controller. The controller recognizes a surrounding object based on data detected by the photodetector. When an object is detected, the controller adjusts a position of the rotating table such that the laser beam is irradiated in a direction where the object is detected.

SUMMARY

According to the conventional system, immediately after the detection of the object, the rotating table is operated in a different operation mode to that prior to the detection. Therefore, detailed information of the detected object can be acquired earlier than when a continuous operation mode is selected before and after the detection. As a general theory, however, when the vehicle is traveling at high speed, it is required to acquire this detailed information quickly. Therefore, it is desirable to advance a first timing of the detection or to acquire the detailed information at the first timing. From this viewpoint of this, the conventional system have room for improvement.

It is an object of the present disclosure to provide a novel system capable of varying detecting mode of an object, taking into account the traveling speed of the vehicle.

A first aspect of the present disclosure is a vehicle control system.

The system comprises a vehicle speed acquisition device, a rotary-typed LIDAR and a controller.

The vehicle speed acquisition device is configured to acquire traveling speed of a vehicle.

The LIDAR is configured to acquire surrounding information of the vehicle using a laser beam.

The controller is configured to control a rotational movement of the LIDAR.

The controller is also configured to execute processing to set a cycle of the rotational movement based on the traveling speed.

In the setting processing, the controller is configured to set the cycle during the traveling speed is relatively fast to a longer cycle than that during the traveling speed is relatively slow.

A second aspect of the present disclosure further has the following features in the first aspect.

The system further comprises a positional information acquisition device and a map database.

The positional information acquisition device is configured to acquire positional information of the vehicle.

The map database is configured to store map information.

The controller is also configured to:

determine, based on the traveling speed and the positional and map information, whether or not a stop line locate on a pathway of the vehicle within a predetermined detecting region; and when it is determined that the stop line locates on the pathway, set the cycle a shorter cycle in the setting processing as compared with a case where it is determined that the stop line does not locate on the pathway.

A third aspect of the present disclosure further has the following features in the first aspect.

The system further comprises a positional information acquisition device and a map database.

The positional information acquisition device is configured to acquire positional information of the vehicle.

The map database is configured to store map information.

The controller is also configured to:

determine, based on the traveling speed and the positional and map information, whether or not a stop line locate on a pathway of the vehicle within a predetermined detecting region; and when it is determined that the stop line locates on the pathway, execute deceleration control in which the traveling speed is decreased than a case where it is determined that the stop line does not locate on the pathway.

A fourth aspect of the present disclosure further has the following features in any one of the first to third aspects.

The system further comprises a positional information acquisition device and a map database.

The positional information acquisition device is configured to acquire positional information of the vehicle.

The map database is configured to store map information.

The controller is also configured to:

determine, based on the traveling speed and the positional and map information, whether or not an object which blocks the laser beam locates around an intersection on a pathway of the vehicle within a predetermined detecting region; and when it is determined that the object locates around the intersection, set the cycle a shorter cycle in the setting processing as compared with a case where it is determined that the object does not locate around the intersection.

A fifth aspect of the present disclosure further has the following features in any one of the first to third aspects.

The system further comprises a positional information acquisition device and a map database.

The positional information acquisition device is configured to acquire positional information of the vehicle.

The map database is configured to store map information.

The controller is also configured to:

determine, based on the traveling speed and the positional and map information, whether or not an object which blocks the laser beam locates around an intersection on a pathway of the vehicle within a predetermined detecting region; and when it is determined that the object locates around the intersection, execute deceleration control in which the traveling speed is decreased than a case where it is determined that the object does not locate around the intersection.

A sixth aspect of the present disclosure further has the following features in any one of the first to fifth aspects.

The system further comprises a surrounding information acquisition device.

The surrounding information acquisition device is configured to acquire the surrounding information.

The controller is also configured to:

execute, based on information on preceding vehicle data which is included in the surrounding information, following control to follow traveling of the preceding vehicle;

determine, under a condition where an inter-vehicular distance is maintained, whether or not the following control is executed; and when it is determined that the following control is executed under the condition, set the cycle a shorter cycle in the setting processing as compared with a case where it is determined that the following control is not executed under the condition.

A seventh aspect of the present disclosure further has the following features in the sixth aspect.

The controller is also configured to:

determine, based on the information on the preceding vehicle, whether or not the preceding vehicle has started decelerating travel during the execution of the following control; and when it is determined that the preceding vehicle has started the decelerating travel, set the cycle a shorter cycle in the setting processing as compared with a case where it is determined that the preceding vehicle has not started the decelerating travel.

According to the first aspect, the setting processing to set the cycle of the rotational movement of the LIDAR is executed. In the setting processing, the cycle during the traveling speed is relatively fast is extended over the cycle during the traveling speed is relatively slow. Therefore, it is possible to make the LIDAR rotate at a high speed as the traveling speed decreases and also make the LIDAR rotate at a low speed as the traveling speed increases. Therefore, it is possible to detect an object in the vicinity of the vehicle at an earlier timing during a low-speed driving. In addition, during a high-speed driving, it is possible to acquire the detailed information of the object which locates far from the vehicle at the first timing of the detection.

According to the second aspect, when it is determined that the stop line locates on the pathway, the cycle is shortened as compared with a case where it is determined that the stop line does not locate on the pathway. The stop line locates within the predetermined detecting region. In front of such the stop line, the vehicle is required to be temporarily stopped. Therefore, there is no problem even if importance for detecting the object existing in front of the stop line is lowered and the cycle is shortened. Rather, by shortening the cycle, it is possible to detect the object around the stop line at an early timing by making the LIDAR rotate at the high speed. Therefore, it is possible to improve running safety.

According to the third aspect, when it is determined that the stop line locates on the pathway, the deceleration control is executed to lower the traveling speed than the case where it is determined that the stop line is not locate on the pathway. If this deceleration control is executed, the cycle is shortened by the execution of the setting processing described in the first aspect. Therefore, it is possible to obtain an effect equivalent to the effect by the second aspect.

According to the fourth aspect, when it is determined that the object locates around the intersection, the cycle is shortened than a case where it is determined that the object does not locate around the intersection. The object is located on the pathway of the vehicle within the predetermined detecting region. If the object locates at a blind spot and rushes out into front of the vehicle from the blind spot, there is a possibility that the detection timing of the same object is delayed. In this respect, if the cycle is shortened, it is possible to make the LIDAR move at the high speed and to detect such a pop-out at an early timing. Therefore, it is possible to improve the running safety.

According to the fifth aspect, when it is determined that the object locates around the intersection, the deceleration control is executed to lower the traveling speed than a case where it is determined that the object does not locate around the intersection. If this deceleration control is executed, the cycle is shortened by the execution of the setting processing described in the first aspect. Therefore, it is possible to obtain an effect equivalent to the effect by the fourth aspect.

According to the sixth aspect, when it is determined that the following control is executed under the particular situation, the cycle is shortened compared to a case where it is determined that the following control is not executed under the same situation. This particular situation indicates a situation where the inter-vehicular distance is kept constant. It is desirable to be paid attention to the preceding vehicle while the following control is executed. In this respect, if the cycle is shortened when the following control is executed under the particular circumstance, it is possible to detect a change in a traveling state of the preceding vehicle at an earlier timing. Therefore, it is possible to improve accuracy of the following control.

According to the seventh aspect, when it is determined that the preceding vehicle has started the decelerating travel, the cycle is shortened as compared with a case where it is determined that the preceding vehicle has not the decelerating travel. If the cycle is shortened, it is possible to detect a change in the traveling state of the preceding vehicle due to an initiation of the decelerating travel at an earlier timing. Therefore, it is possible to improve the accuracy of the following control moreover.

DESCRIPTION OF EMBODIMENTS

Embodiments of the present disclosure are described hereunder with reference to the accompanying drawings. However, it is to be understood that even when the number, quantity, amount, range or other numerical attribute of an element is mentioned in the following description of the embodiments, the present disclosure is not limited to the mentioned numerical attribute unless it is expressly stated or theoretically defined. Further, structures or steps or the like described in conjunction with the following embodiments are not necessarily essential to embodiments of the present disclosure unless expressly stated or theoretically defined.

1. First Embodiment

First, a first embodiment will be described with reference to FIGS. 1 to 5.

1.1 Entire Configuration of Vehicle Control System

Figure 1:
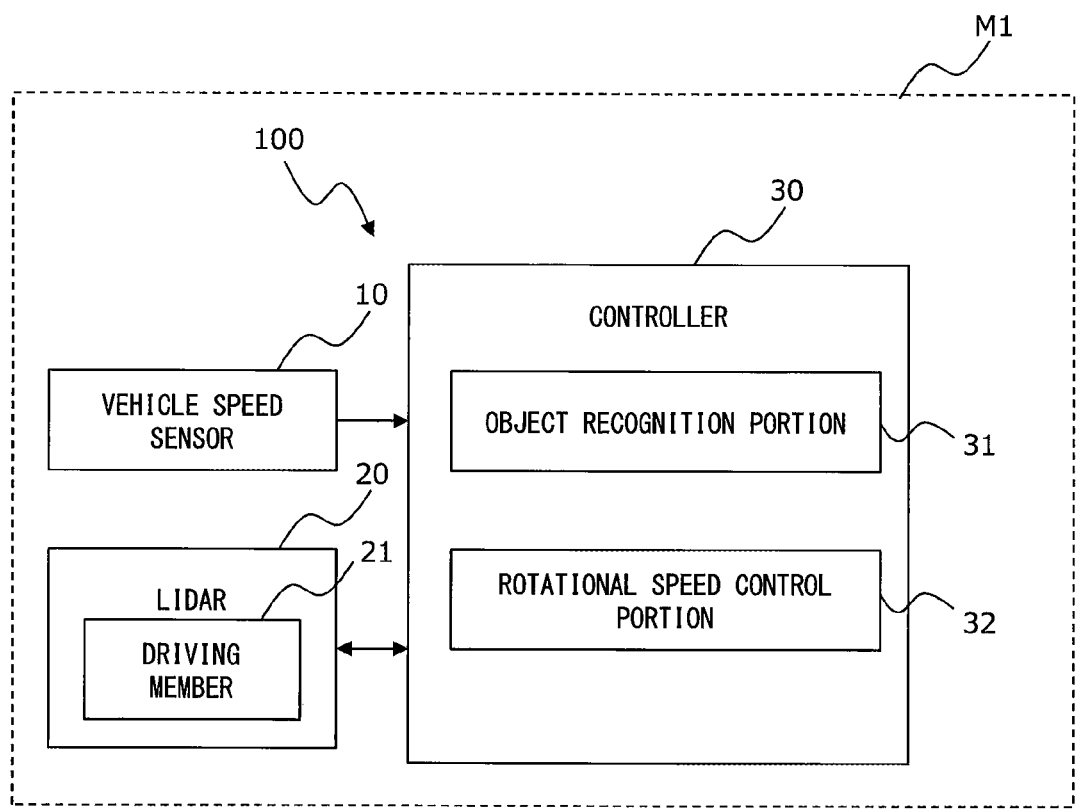
FIG. 1 is a diagram showing a configuration example of a vehicle control system according to a first embodiment.

FIG. 1 is a diagram showing a configuration example of a vehicle control system (hereinafter referred to simply as a "system") according to the first embodiment. The system 100 shown in FIG. 1 is mounted on a vehicle M1. Examples of the vehicle M1 include a vehicle in which an engine is used as a power source, an electronic vehicle in which a motor is used as the power source, and a hybrid vehicle including the engine and the motor. The motor is driven by a battery such as a secondary battery, a hydrogen fuel cell, a metal fuel cell, an alcohol fuel cell, or the like.

As shown in FIG. 1, the system 100 includes a vehicle speed sensor 10, a LIDAR 20, and a controller 30.

A vehicle speed sensor 10 is a device that acquires a traveling speed of the vehicle M1 (hereinafter also referred to as "vehicle speed"). A wheel speed sensor is exemplified as the vehicle speed sensor 10. The wheel speed sensor may be provided on wheels of the vehicle M1 or on a drive shaft which rotates integrally with the wheels. The vehicle speed sensor 10 transmits the acquired data of the vehicle speed to the controller 30.

The LIDAR 20 is a device that acquires information on surrounding of the vehicle M1 using a laser beam. The LIDAR 20 includes a laser, a movable mirror, and a photodetector. The laser emits light. Number of light emissions per second is unique to the LIDAR 20. The movable mirror reflects the emitted light (i.e., the laser beam) from the laser to irradiate surrounding environment. The direction of movement of the movable mirror may be a horizontal direction or a vertical direction. A mechanical mirror is exemplified as the movable mirror. Examples of the mechanical mirror include a polygon mirror and a small integrated mirror which uses a MEMS (Micro Electra Mechanical Systems) technique. The photodetector detects light reflected from the surrounding environment. The photodetector transmits the detected data of the reflected light to the controller 30.

The LIDAR 20 further includes a driving member 21 to drive the movable mirror. The driving member 21 controls cycle of rotational movement $T[s^{-1}]$ of the movable mirror based on a control signal from the controller 30. The cycle T is defined as a period until the movable mirror, which has started the rotational movement from a reference position, returns to the reference position via a turn-around position. For convenience of explanation, the present disclosure assumes that deflection angle of the movable mirror is 360 degrees, and the rotational speed $\omega$ [Hz] per second of the movable mirror is controlled instead of controlling the cycle T.

The controller 30 is a microcomputer that includes a processor, a memory, and an input interface and an output interface. The controller 30 receives various kinds of data via the input and output interface. The information received by the controller 30 includes vehicle speed and reflected light information. The controller 30 executes various controls based on the received data.

1.2 Configuration of Controller

The configuration of the controller 30 will be described. As shown in FIG. 1, the controller 30 includes an object recognition portion 31 and a rotational speed control portion 32 as function blocks related to the rotational speed control of the LIDAR 20. These function blocks are realized when the processor of the controller 30 executes various types of control program stored in the memory.

The object recognition portion 31 executes processing to recognize objects around the vehicle M1 based on the reflected light data. The objects around the vehicle M1 include a moving object and a stationary object. Examples of the moving object include a vehicle, a motorcycle, a bicycle, and a walker. Examples of the stationary object include a white lane and a mark. Known processing is applied to the recognition processing. Therefore, descriptions of the recognition processing are omitted.

The rotational speed control portion 32 executes rotational speed control in which the rotational speed $\omega$ of the LIDAR 20 is controlled based on the information on the vehicle speed. In the rotational speed control, processing to set the rotational speed $\omega$ in accordance with the vehicle speed is executed. This setting processing will be described below.

1.3 Setting Processing

In the setting processing, the rotational speed $\omega$ is set based on an upper limit value $\omega 1$ and a lower limit value $\omega 2$ of the rotational speed $\omega$. Prior to the explanation of the upper limit value $\omega 1$ and the lower limit value $\omega 2$, a relationship between density of the rotational speed $\omega$ and the laser beam (or the density of the data (point group)) $\rho$ constituting the reflected light data) will be described. As mentioned above, the number of the irradiation of the laser beam is unique to the LIDAR 20. Therefore, when the rotational speed $\omega$ changes under a constant vehicle speed condition, the density $\rho$ changes. Specifically, when the rotational speed $\omega$ increases, the density $\rho$ decreases. And when the rotational speed $\omega$ decreases, the density $\rho$ increases. When the density $\rho$ is high, information amount of the objects included in the reflected light is larger than when the density $\rho$ is low.

1.3.1 Upper Limit Value $\omega 1$

Figure 2:
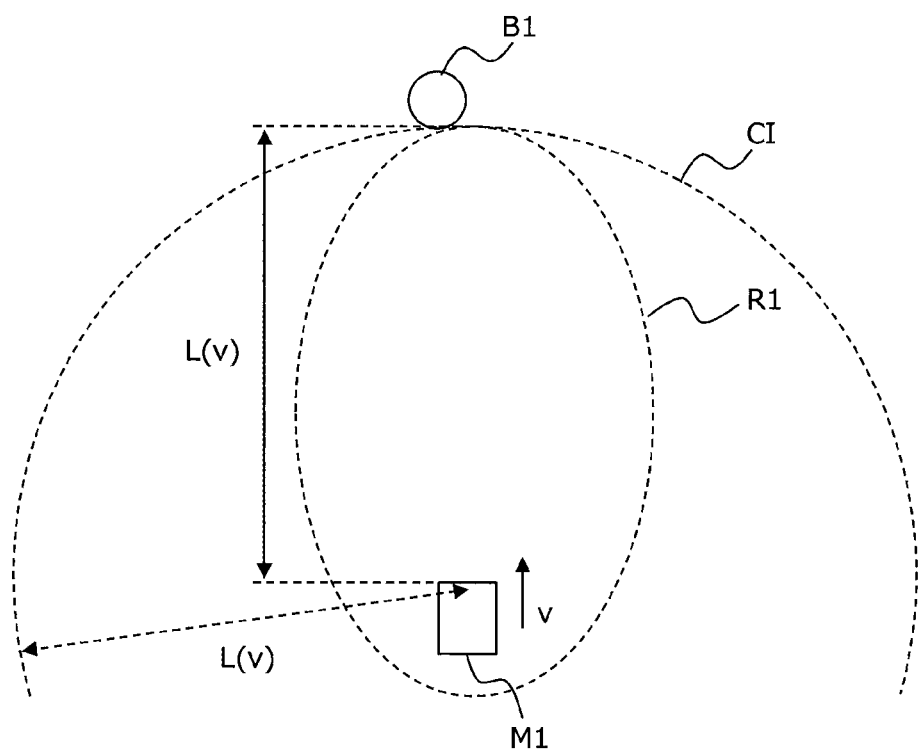
FIG. 2 is a diagram for explaining an upper limit condition of rotational speed $\omega$ per second of a movable mirror.

FIG. 2 is a diagram for explaining the upper limit condition of the rotational speed $\omega$. The vehicle M1 shown in FIG. 2 travels at vehicle speed v on a traffic lane. In front of the vehicle M1, an object B1 (specifically a stationary object) is present. The object B1 is located a periphery portion of a detecting region R1. The detecting region R1 is defined as an area where any object is required to be detected from a viewpoint of securing the running safety. Many parts of the detecting region R1 extend toward a travel direction of the vehicle M1. An area SR1 of the detecting region R1 increases or decreases in accordance with the vehicle speed. Specifically, the area SR1 increases as the vehicle speed increases whereas it decreases as the vehicle speed decreases.

In order to avoid contacting with the object B1, the vehicle M1 must be stopped in front of the object B1 after the object recognition portion 31 recognizes the object B1. A travel length L(v) from a position where the object B1 is recognized to a position where the vehicle M1 stops is expressed by the following equation (1) using vehicle speed v, and coefficients a and b.

$$L(v) = av + bv^2 \qquad (1)$$

The first term on the right side of the equation (1) represents an idle traveling length, and the second term on the right side of the equation (1) represents a braking length. The idle traveling length is defined as a length that the vehicle M1 travels from the recognition of the object B1 until a brake device of the vehicle M1 begins to work. The braking length is defined as a length that the vehicle M1 travels from the brake device begins to work until the vehicle M1 stops.

Here, a circle CI whose radius is the travel length L(v) is considered. The circumference length of the circle CI is represented by $2\pi L(v)$. The density $\rho$ at a position separated from the vehicle M1 by the travel length L(v) is expressed by the following equation (2) using the number N of the laser beam per second, the rotational speed $\omega$ and the travel length (v).

$$\rho = (N/\omega)/2\pi L(v) \qquad (2)$$

Furthermore, a lowest value $\rho$ min of the density $\rho$ required to recognize the objects around the vehicle M1 is considered. The lowest value $\rho$ min is able to set from a software configuration to execute the recognition processing and a configuration of the LIDAR 20. Then, if at least the density $\rho$ is equal to or larger than the lowest value $\rho$ min, the object B1 is able to be recognized, and the contacting with the object B1 is able to be avoided by a deceleration operation after the recognition. That is, if the density $\rho$ satisfies the condition show with the following equation (3), it is possible to avoid contacting with the object B1.

$$\rho \geq \rho_{min} \qquad (3)$$

The condition shown in the following equation (4) is derived from the equations (2) and (3). This condition is defined as the upper limit condition of the rotational speed $\omega$.

$$\omega \leq N/(2\pi L(v) \rho_{min}) \qquad (4)$$

The rotational speed $\omega$ when the values of the left side and the right side of the expression (4) are equal corresponds to the upper limit value $\omega 1$.

1.3.2 Lower Limit Value $\omega 2$

Figure 3:
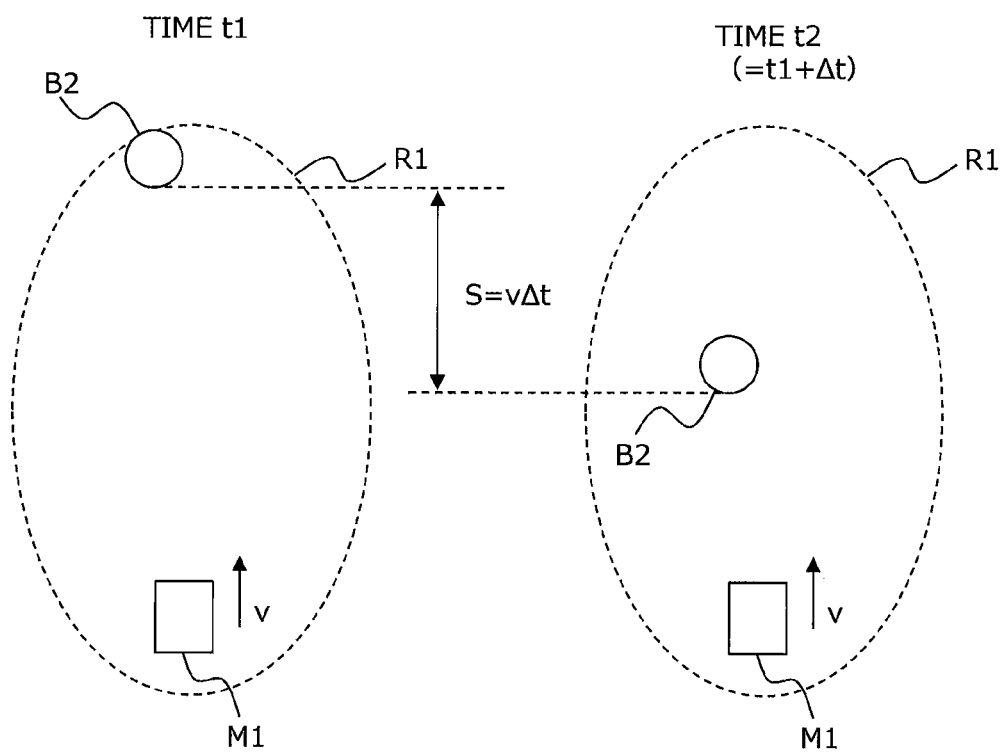
FIG. 3 is a diagram for explaining a lower limit condition of the rotational speed $\omega$.

FIG. 3 is a diagram for explaining the lower limit condition of the rotational speed $\omega$. The vehicle M1 shown in FIG. 3 travels at a constant vehicle speed v speed on the traffic lane from time t1 to time t2. In front of the vehicle M1, an object B2 (specifically a stationary object) is present. The object B2 has been detected by the LIDAR 20 not only at the time t1 but also at the time t2. An interval $\Delta t$ from the time t1 to the time t2 corresponds to the cycle T. The positions at which the object B2 have been detected are a periphery portion of the detecting region R1 at the time t1 and a vicinity of the vehicle M1 at the time t2.

In order to treat the object B2 as same object, a length S between the detected position of the object 132 at the time t1 and that at the time t2 requires to be less than or equal to a tolerance Smax. The tolerance Smax can be set from the software configuration to execute the recognition processing and the configuration of the LIDAR 20. That is, if the length S satisfy the condition of the following equation (5), the object B2 can be treated as the same object.

$$\begin{aligned} S &= v \cdot \Delta t \\ &= v \cdot T \\ &= v/\omega \leq S\max \end{aligned} \qquad (5)$$

The condition shown in the following equation (6) is derived from the equation (5). This condition is defined as the lower limit condition of the rotational speed $\omega$.

$$\omega \geq v/S \max \qquad (6)$$

The rotational speed $\omega$ when the values of the left side and the right side of the expression (6) are equal corresponds to the lower limit value $\omega 2$.

1.4 Example of Setting Processing

Figure 4:
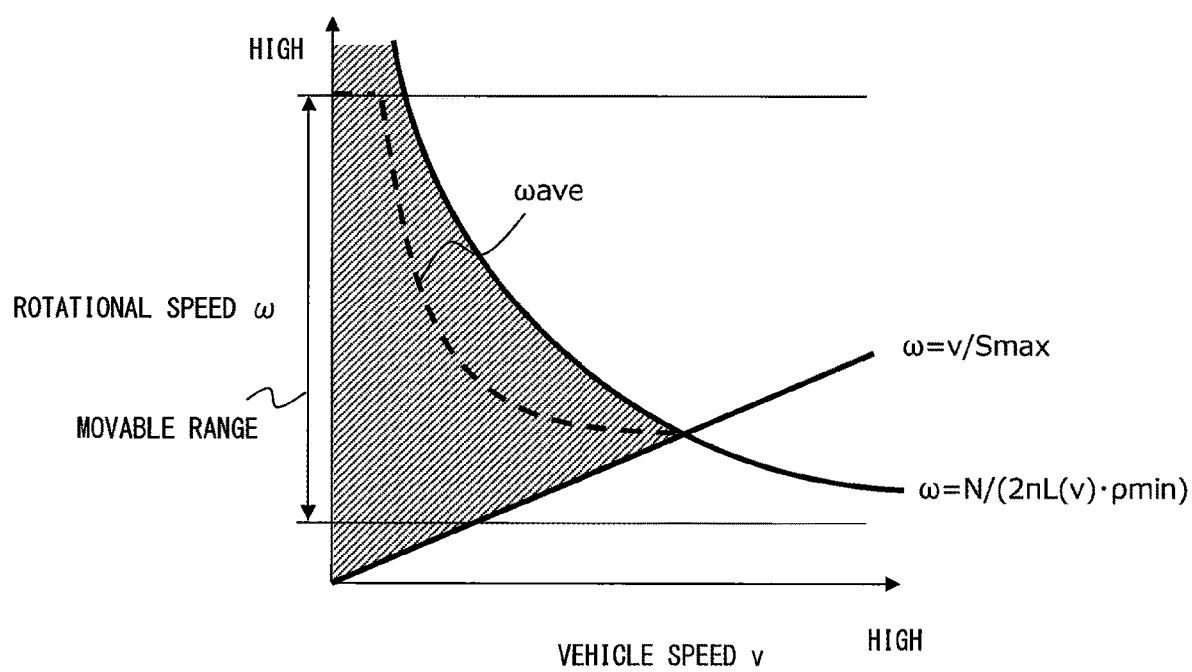
FIG. 4 is a diagram for explaining an example of setting processing of the rotational speed $\omega$.

FIG. 4 is a diagram for explaining an example of the setting processing of the rotational speed $\omega$. When the conditions shown with the equations (4) and (6) are drawn on a plane having the vehicle speed v as the horizontal axis and the rotational speed $\omega$ as the vertical axis, a range of the rotational speed $\omega$ which satisfies the upper limit and the lower limit conditions at the same time is specified. In the example shown in FIG. 4, the rotational speed $\omega$ is set as an average $\omega$ave between the upper limit value $\omega 1$ and the lower limit value $\omega 2$. However, if constraints on the configuration of the movable mirror (e.g., upper limit and lower restrictions) are separately imposed, the rotational speed $\omega$ is modified to fit within a movable range specified by the constraints.

The average $\omega$ave is set based on the upper limit value $\omega 1$ and the lower limit value $\omega 2$ obtained by referring to an upper limit map and a lower limit map individually. The upper limit map is a control map in which the upper limit value $\omega 1$ is set for each vehicle speed v. The lower limit map is a control map in which the lower limit value $\omega 2$ is set for each vehicle speed v. These control maps are preset and stored in the memory.

The average $\omega$ave may be set directly by referring to an average map. The average map is a control map in which the average $\omega$ave is set for each vehicle speed v. The vehicle speed v, the upper limit value $\omega 1$ and the lower limit value $\omega 2$ may be separately calculated based on the equations (4) and (6), and the average $\omega$ave may be calculated based on the calculated values.

As can be seen from the tendency of the average $\omega$ave shown in FIG. 4, the average $\omega$ave during the vehicle speed v is relatively high becomes slower than that during the vehicle speed v is relatively low. That is, when the rotational speed $\omega$ is set to the average $\omega$ave by the execution of the setting processing, the movable mirror rotates at higher speed as the vehicle speed v decreases whereas the movable mirror rotates at lower speed as the vehicle speed v increases.

As described in the section 1.3, the density $\rho$ decreases as the rotational speed $\omega$ increases, whereas the density $\rho$ increases as the rotational speed ω decreases. Furthermore, when the density ρ is high, the information amount of the objects included in the information on the reflected light becomes larger than when the density ρ is low. Therefore, when the rotational speed ω is set to the average ωave, the density ρ increases as the vehicle speed v increases, and thus the information amount increases.

1.5 Example of Specific Processing

Figure 5:
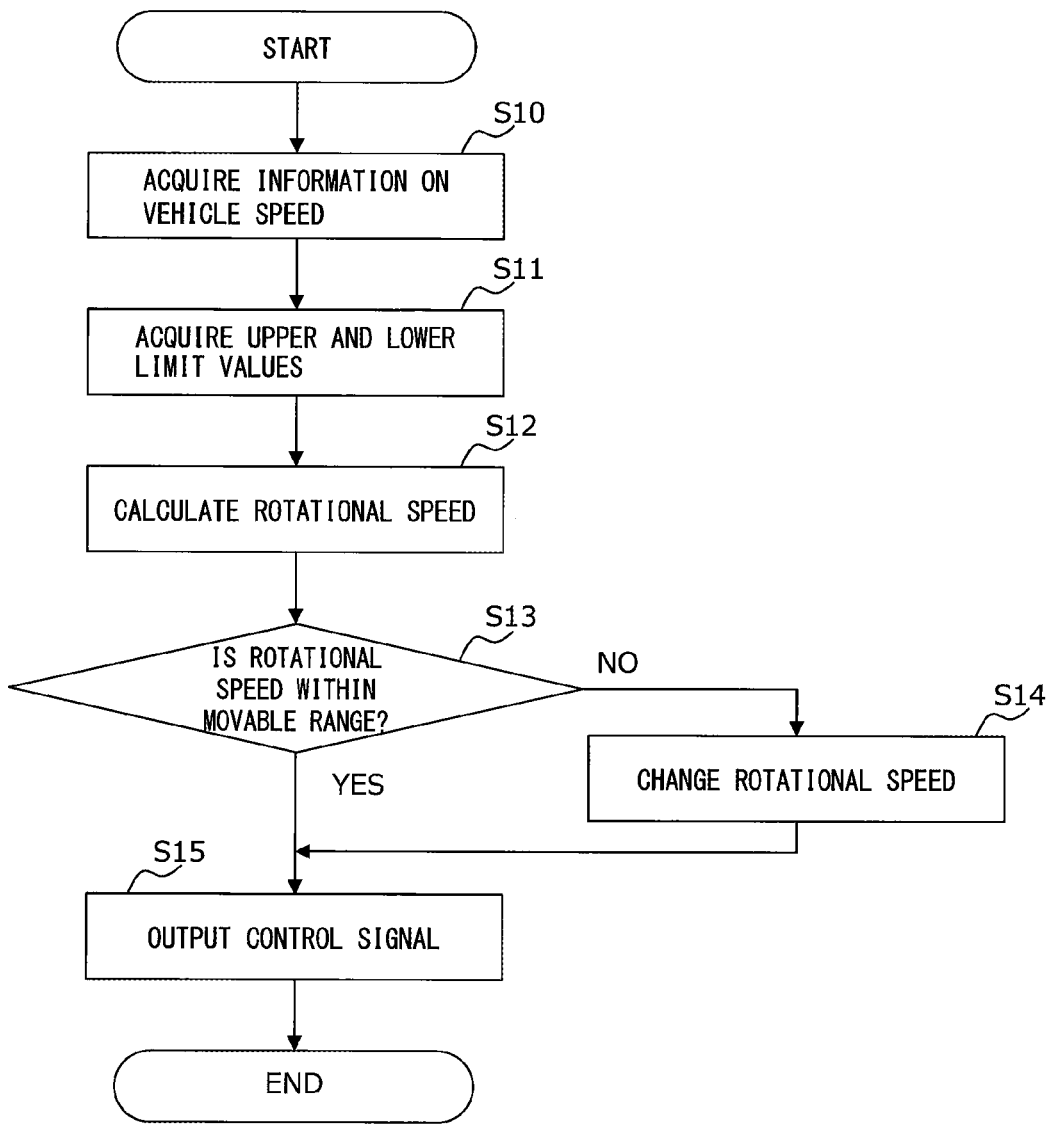
FIG. 5 is a flow chart for explaining a flow of rotational speed control processing executed by a controller.

FIG. 5 is a flow chart for explaining a flow of processing to execute the rotational speed control executed by the controller 30. The processing routine shown in FIG. 5 is repeatedly executed at a predetermined control cycle while the vehicle M1 is traveling.

In the processing routine shown in FIG. 5, first, the information on the vehicle speed is acquired (step S10). The information on the vehicle speed is that transmitted from the vehicle speed sensor 10.

Subsequent to the step S10, the upper limit value ω1 and the lower limit value ω2 are acquired (step S11). The upper limit value ω 1 is obtained by referring to the upper limit map. The lower limit value ω2 is obtained by referring to the lower limit map.

Subsequent to the step S11, the rotational speed ω is calculated (step S12). The rotational speed ω is calculated by averaging the upper limit value ω1 and the lower limit value ω2 (i.e. the average ωave).

Subsequent to the step S12, it is determined whether or not the rotational speed ω is within the movable range (step S13). When the rotational speed ω calculated in the step S12 is between the lower and upper restrictions, it is determined that the rotational speed ω is within the movable range. Otherwise, it is determined that the rotational speed ω is outside the movable range.

If the determination result of the step S13 is negative, the rotational speed ω is changed (step S14). The change of the rotational speed ω is executed by considering content of the determination of the step S13. Specifically, if the rotational speed ω is less than lower restriction, the rotational speed ω is changed to the lower restriction. If the rotational speed ω is higher than upper restriction, the rotational speed ω is changed to the upper restriction.

Subsequent to the step S13 or S14, a control signal is output (step S15). The control signal is output in accordance with the rotational speed ω set in the step S13 or S14. The control signal is input to the driving member 21. In this way, the rotational speed of the movable mirror is controlled.

1.6 Advantageous Effects

According to the first embodiment described above, the setting processing is executed in the rotational speed control. The setting processing allows the movable mirror to rotate faster as the vehicle speed decreases. Therefore, it is possible to detect the objects in the vicinity of the vehicle M1 at an earlier timing during a low-speed driving. Furthermore, it is possible to rotate the movable mirror at lower speed as the vehicle speed increases. Therefore, it is possible to acquire the detailed information of the object which locates far from the vehicle M1 at the first detecting time during a high-speed driving.

2. Second Embodiment

Next, a second embodiment will be described with reference to FIGS. 6 to 10. Explanation of the same configuration as that of the first embodiment will be omitted as appropriate.

2.1 Entire Configuration of Vehicle Control System

Figure 6:
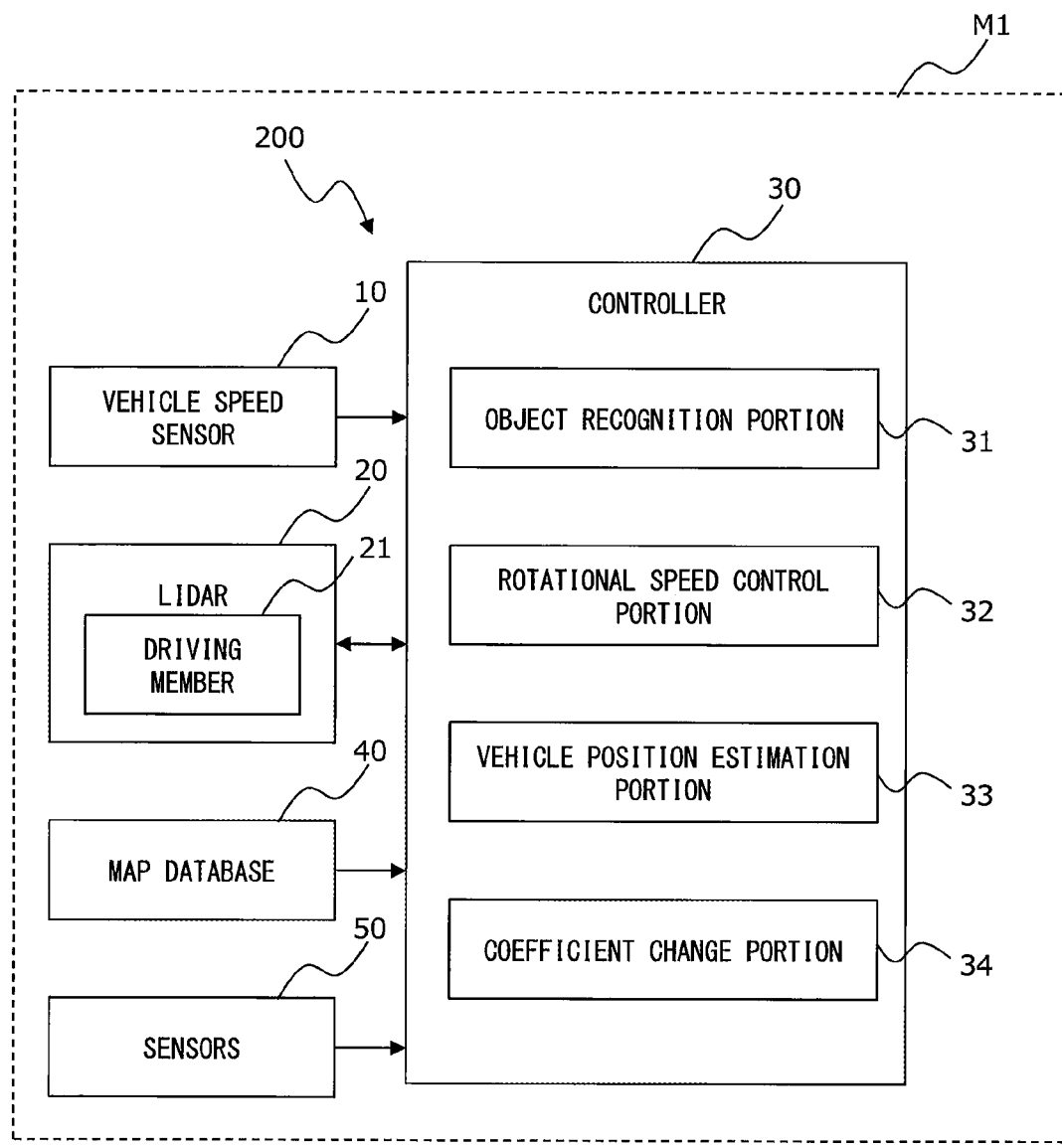
FIG. 6 is a diagram for explaining a configuration example of a vehicle control system according to a second embodiment.

FIG. 6 is a diagram for explaining a configuration example of the vehicle control system according to the second embodiment. The system 200 shown in FIG. 6 is mounted on the vehicle M1. The system 200 includes the vehicle speed sensor 10, the LIDAR 20, the controller 30, a map database 40, and sensors 50.

The map database 40 is a data base in which high-precision map information is stored. The map information includes information on positional information and road shape of roads (e.g., information on road type such as straight and curve, and curvature of the curve). The positional information on the roads also includes information on intersections and divergent points. The map information also includes information on marks on the roads (e.g., compartment lines, stop lines and crosswalks) and that installed at breakdown lanes (e.g., information on no-parking areas, legal speed and stop lines). The map information also includes information on appendages on the roads (e.g., location, geometry and width). The appendage includes constructions (e.g., guard fences, marks and light fixtures) installed around the roads and buildings founded next to the roads.

The map database 40 is formed in a storage device (e.g., a hard disk and a flash memory) mounted on the vehicle M1. The map database 40 may be formed in a computer of a facility (e.g., a management center) that is capable of communicating with the vehicle M1.

The sensors 50 includes a GPS (Global Positioning System) receiver, an external sensor, and an internal sensor.

The GPS receiver is a device that receives signals from more than two GPS satellites. The GPS receiver is also a device to require information on position of the vehicle M1. The GPS receiver calculates the position and orientation of the vehicle M1 based on the received signals. The GPS receiver transmits the calculated data to the controller 30.

The external sensor is a device to acquire the information on the surrounding of the vehicle M1. The LIDAR 20 is also a type of the external sensor. However, the LIDAR 20 is not included in the external sensor referred to herein. Examples of the external sensor include a millimeter wave radar and a camera. The millimeter wave radar detects the objects around the vehicle M1 by using radio waves. The camera images surrounding conditions of the vehicle M1. The external sensor transmits the detected data to the controller 30.

The internal sensor is a device that acquires a traveling state of the vehicle M1. The vehicle speed sensor 10 is also a type of internal sensor. However, the vehicle speed sensor 10 is not included in the internal sensor referred to herein. Examples of the internal sensor include an acceleration sensor and an acceleration yaw rate sensor. The acceleration sensor detects acceleration of the vehicle M1. The yaw rate sensor detects yaw rate around a vertical axis of a center of gravity of the vehicle M1. The internal sensor transmits the detected data to the controller 30.

2.2 Configuration of Controller

The configuration of the controller 30 will be described. As shown in FIG. 6, the controller 30 includes an object recognition portion 31, a rotational speed control portion 32, a vehicle position estimation portion 33, and a coefficient change portion 34. These function blocks are function blocks associated with the rotational speed control. These function blocks are realized when the processor or the controller 30 executes various types of control program stored in the memory.

The vehicle position estimation portion 33 executes processing to estimate actual position of the vehicle M1 based on the data from the sensors 50 and the map information. In the estimate processing, the information from the GPS receiver is compared with the map information, whereby the position of the vehicle M1 on a map is specified. The specified position of the vehicle M1 is transmitted to the coefficient change portion 34.

The coefficient change portion 34 executes processing to change a coefficient α based on the information on the vehicle speed, the positional information of the vehicle M1 and the map information. The coefficient α is a weighting coefficient used in the setting process of the rotational speed ω. This coefficient change processing will be described below. For convenience of explanation, the coefficient change processing of the present embodiment will be referred to as "first change processing".

2.3 First Change Processing

As described above, in the setting processing, the rotational speed ω is set based on the upper limit value ω1 and the lower limit value ω2. By using the upper limit value ω1, the lower limit value ω2, and the coefficient α, an arithmetic expression of the rotational speed ω is expressed by the following expression (7).

$$\omega = \alpha \cdot \omega 1 + (1-\alpha) \cdot \omega 2 \quad (7)$$

A default value α0 of the coefficient α is set to 0.5. In the first change processing, when a first change condition or a second change condition is satisfied, the coefficient α is changed to a value larger than the default value α0. The first and second change conditions will be described below.

2.3.1 First Change Condition

Figure 7:
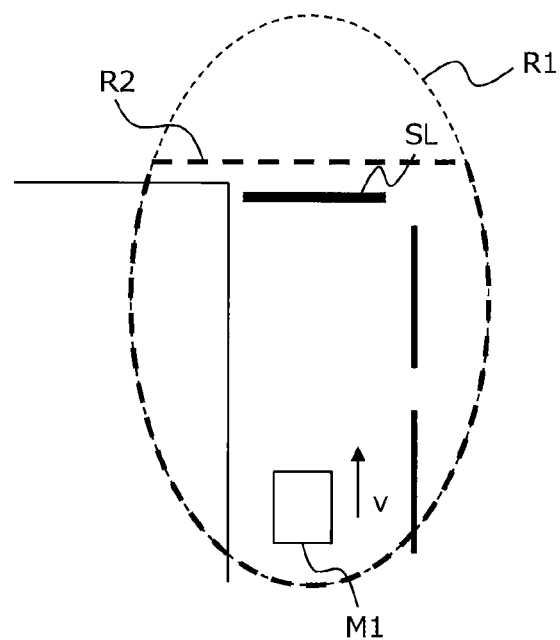
FIG. 7 is a diagram for explaining an example in which a first change condition is satisfied.

The first change condition is satisfied when there is a stop line on a pathway of the vehicle M1 within the detecting region R1. FIG. 7 is a diagram for explaining examples in which the first change condition is satisfied. In FIG. 7, a stop line SL is drawn on a road in front of the vehicle M1. If such the stop line SL is present, the vehicle M1 is required to be temporarily stopped in front of the stop line SL. If the vehicle M1 stops in front of the stop line SL, an importance to detect the objects existing in front of the stop line SL is reduced. For this reason, when the stop line SL is present, a detecting region R2 is drawn whose shape misses a portion in front of the normal detecting region R1.

2.3.2 Second Change Condition

Figure 8:
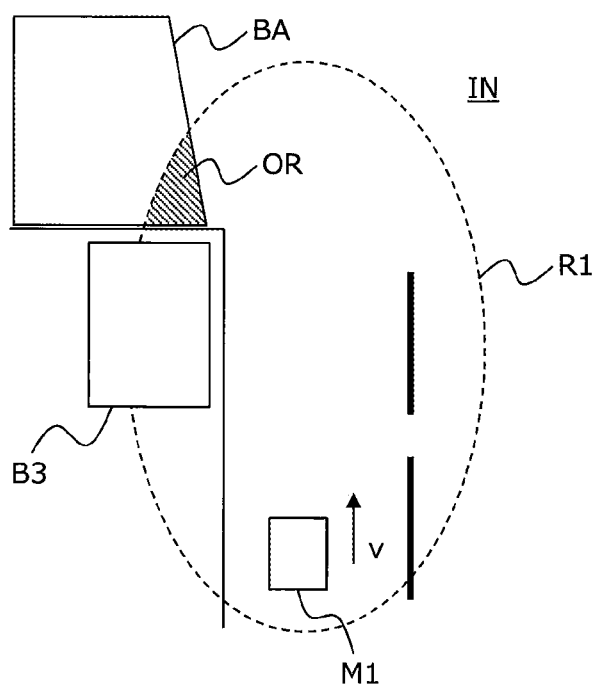
FIG. 8 is a diagram for explaining an example in which a second change condition is satisfied.

The second change condition is satisfied when there is the laser beam blocking object around an intersection on the pathway of the vehicle M1 within the detecting region R1. FIG. 8 is a diagram for explaining examples in which the second change condition is satisfied. The vehicle M1 shown in FIG. 8 is proceeding towards an intersection IN. An object B3 (specifically, a building) exists around the intersection IN. When such the object B3 is present, a barrier area BA is formed where the laser beam is not irradiated. Then, an overlapping region OR between the barrier area BA and the detecting region R1 becomes a blind spot.

2.3.3 Specific Example of First Change Processing

Figure 9:
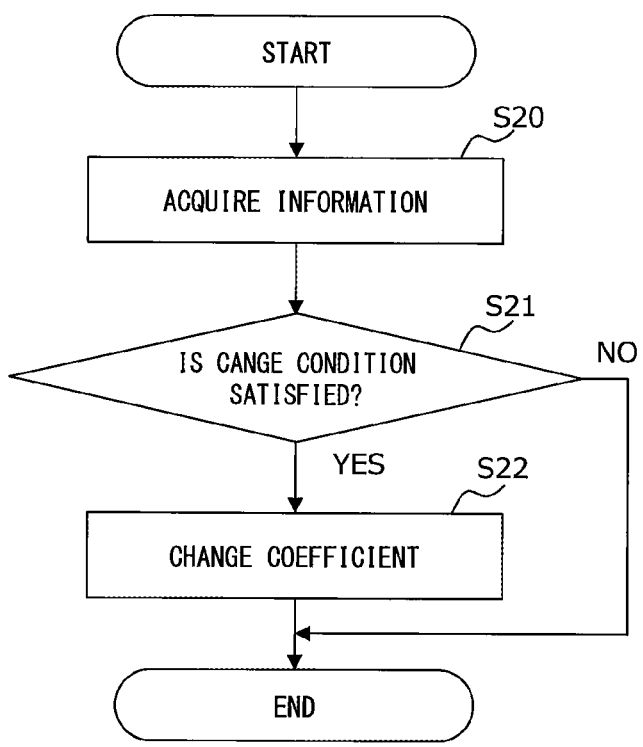
FIG. 9 is a flow chart for explaining a flow of first change processing executed by the controller.

FIG. 9 is a flow chart for explaining the flow of first change processing executed by the controller 30. The processing routine shown in FIG. 9 is repeatedly executed at a predetermined control cycle while the vehicle M1 is traveling.

In the processing routine shown in FIG. 9, first, information is acquired (step S20). The information to be acquired is the information on the vehicle speed, the positional information and the map information. In the processing of the step S20, an area of the detecting region R1 (i.e., the area SR1) is specified based on the information on the vehicle speed. The stop line SL or the barrier area BA is also specified based on the positional information and the map information.

Subsequent to the step S20, it is determined whether or not the first or second change condition is satisfied (step S21). In the processing of the step S21, it is determined whether or not the change condition described in FIG. 7 or 8 is satisfied based on the area SR1, the stop line SL and the barrier area BA specified in the step S20.

If it is determined that the first or second change condition is satisfied, the coefficient α is changed (step S22). Specifically, the coefficient α is changed to the value larger than the default value α0.

2.4 Advantageous Effects

Figure 10:
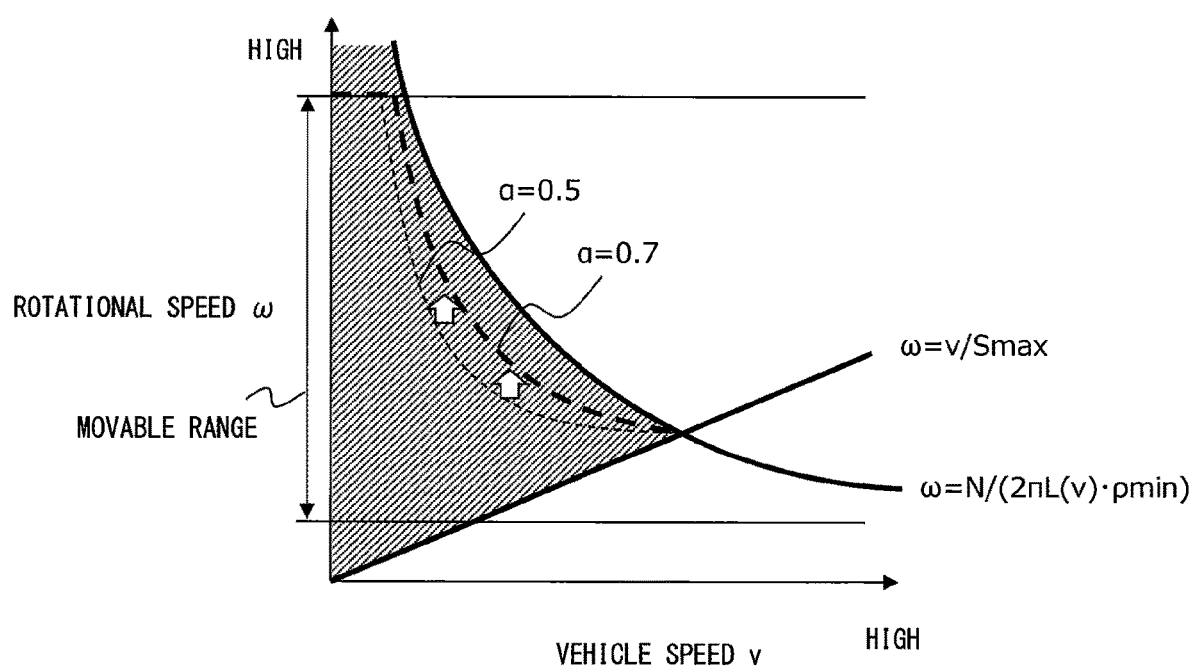
FIG. 10 is a diagram for explaining the rotational speed $\omega$ set in the setting processing when the first change processing is executed.

FIG. 10 is a diagram for explaining the rotational speed ω set in the setting processing when the first change processing is executed. FIG. 10 shows the tendency of the rotational speed ω when the coefficient α is set 0.5 (i.e., the default value α0) and that of the rotational speed ω when the coefficient α is set 0.7. The tendency when the coefficient α is set 0.7 corresponds to that when the first change processing is executed. As can be seen from comparing the two tendencies while fixing the vehicle speed condition, when the first change processing is executed, the value of the rotational speed ω increases. Therefore, when the first change processing is executed, the movable mirror rotates at the higher speed.

As described in FIG. 7, the presence of the stop line SL reduces the importance to detect the objects existing in front of the stop line SL. Further, as described in FIG. 8, when the barrier area BA is formed, the overlapping region OR becomes the blind spot. In this respect, if the movable mirror is rotated at the higher speed by executing the first change processing, it is possible to detect the objects around the stop line SL at an earlier timing. In addition, it is possible to detect a pop-out of an object from the blind spot at an early timing. Therefore, the running safety can be improved.

3. Third Embodiment

Next, a third embodiment will be described with reference to FIGS. 11 to 14. Explanation of the same configuration as that of the first or second embodiment will be omitted as appropriate.

3.1 Entire Configuration of Vehicle Control System

Figure 11:
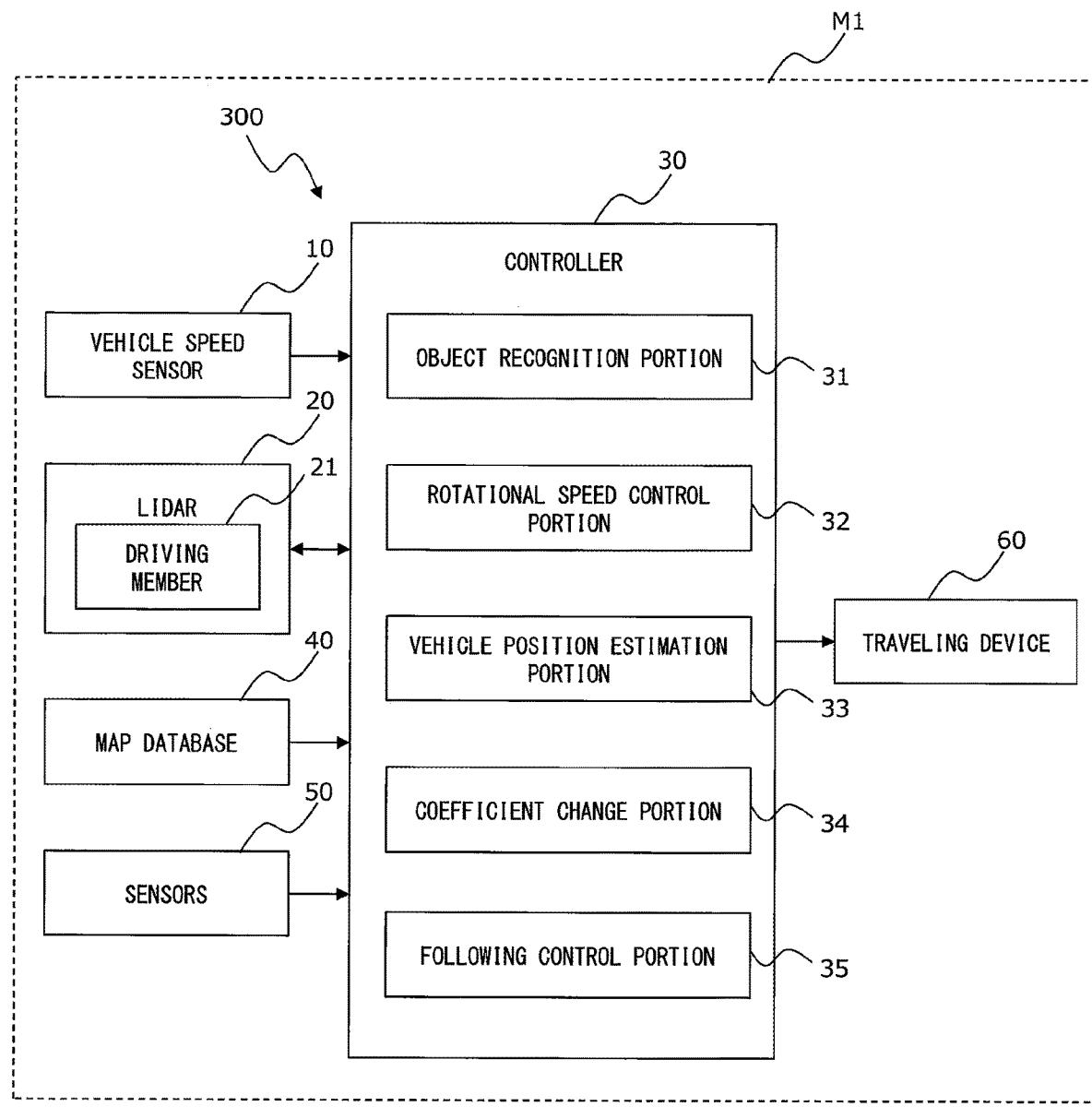
FIG. 11 is a diagram for explaining a configuration example of a vehicle control system according to a third embodiment.

FIG. 11 is a diagram for explaining a configuration example of the vehicle control system according to the third embodiment. The system 300 shown in FIG. 11 is mounted on the vehicle M1. The system 300 includes the vehicle speed sensor 10, the LIDAR 20, the controller 30, the map database 40, the sensors 50 and a traveling device 60.

The traveling device 60 automatically drives the vehicle M1 in accordance with control signals from the controller 30. The traveling device 60 includes a driving force outputting device, a steering device and a brake device. The driving force outputting device generates a driving force for traveling. The steering device turns the wheels. The brake device generates a braking force to be applied to the wheels.

3.2 Configuration of Controller

The configuration of the controller 30 will be described. As shown in FIG. 11, the controller 30 includes the object recognition portion 31, the rotational speed control portion 32, the vehicle position estimation portion 33, the coefficient change portion 34, and a following control portion 35. These function blocks are function blocks associated with the rotational speed control. These function blocks are realized when the processor of the controller 30 executes various types of control program stored in the memory.

The following control portion 35 executes following control to follow the traveling of a preceding vehicle M2 by the operation of the traveling device 60. The preceding vehicle M2 may be recognized based on the information on the reflected light or may be recognized based on the information from the external sensor. The preceding vehicle M2 may be recognized based on an integration of these information. As processing to execute the following control, a known processing is applied. Therefore, descriptions of the processing of the following control are omitted.

The coefficient change portion 34 executes processing to change the coefficient $\alpha$ based on the information on the preceding vehicle M2. This coefficient change processing will be described below. For convenience of explanation, the coefficient change processing of the present embodiment will be referred to as "second change processing".

3.3 Second Change Processing

In the second change processing, when a third condition or a fourth change condition is satisfied, the coefficient $\alpha$ is changed to the value larger than the default value $\alpha 0$. Hereinafter, the third and fourth change conditions and the processing examples executed when these change conditions are satisfied will be described.

3.3.1 Third Change Condition

Figure 12:
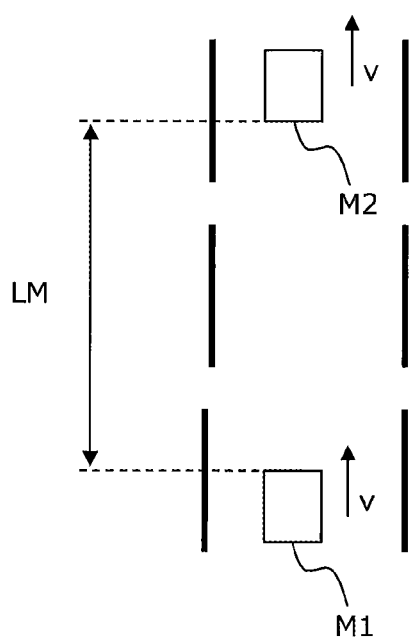
FIG. 12 is a diagram for explaining an example in which a third change condition is satisfied.

The third change condition is satisfied when the following control is executed and an inter-vehicular distance is kept constant. The inter-vehicular distance is a distance between the preceding vehicle M2 and the vehicle M1. FIG. 12 is a diagram for explaining examples in which the third change condition is satisfied. The vehicle M1 shown in FIG. 12 automatically travels based on the execution of the following control. The vehicle speed v of the vehicle M1 is equal to that of the preceding vehicle M2. Therefore, an inter-vehicular distance LM is kept constant.

Figure 13:
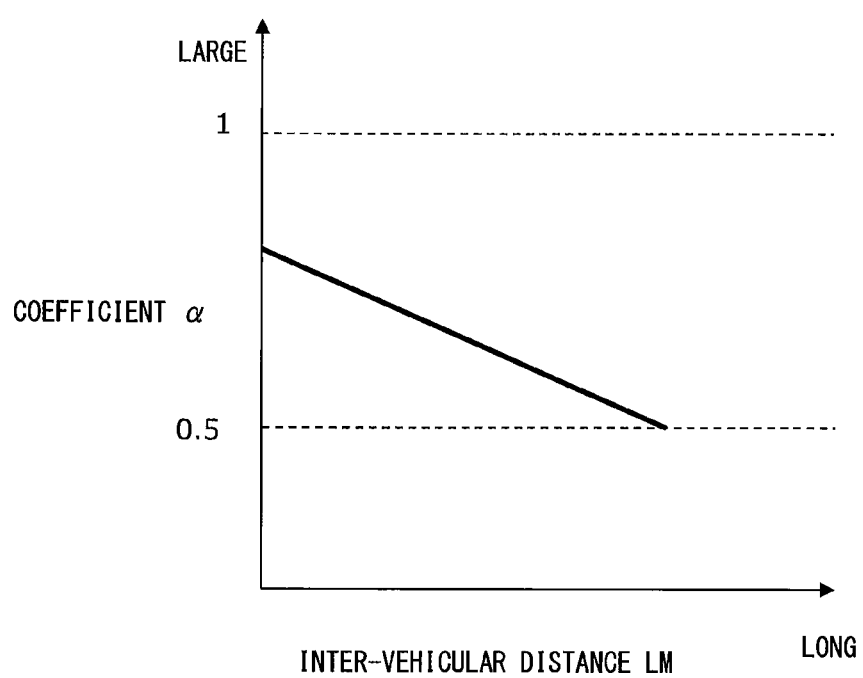
FIG. 13 is a diagram for explaining an example of second change processing executed when a third change condition is satisfied.

FIG. 13 is a diagram for explaining an example of the second change processing executed when the third change condition is satisfied. In the example shown in FIG. 13, the shorter the inter-vehicular distance LM is, the larger value the coefficient $\alpha$ is changed. The lowest value of the coefficient $\alpha$ is the default value $\alpha 0$. The coefficient $\alpha$ is set to the smallest value when the inter-vehicular distance LM is maintained at a longest inter-vehicular distance that can be set in the following control.

3.3.2 Fourth Change Condition

The fourth change condition is satisfied when the following control is executed and the preceding vehicle M2 decelerates its speed. The decelerating travel of the preceding vehicle M2 may be recognized based on the information on the reflected light or may be recognized based on the information from the external sensor. If the preceding vehicle M2 decelerates its speed, the preceding vehicle M2 may tack or stop.

Figure 14:
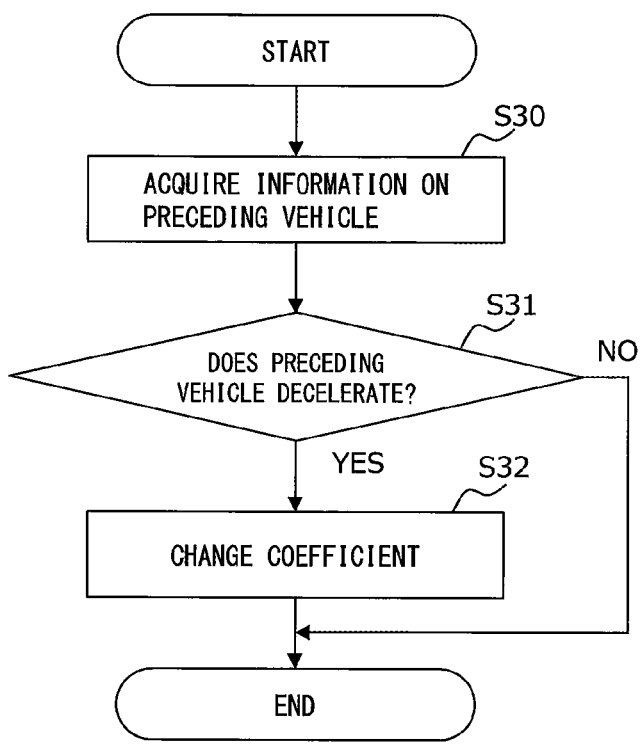
FIG. 14 is a flow chart for explaining a flow of second change processing executed by the controller based on a fourth change condition.

FIG. 14 is a flow chart for explaining the flow of the second change processing executed by the controller 30 based on the fourth change condition. The processing routine shown in FIG. 14 is repeatedly executed at a predetermined control cycle during the following control is executed.

In the processing routine shown in FIG. 14, first, the information on the preceding vehicle M2 is acquired (step S30). The information to be acquired is the information indicating a traveling state of the preceding vehicle M2.

Subsequent to the step S30, it is determined whether or not the preceding vehicle M2 decelerate its speed (step S31).

The processing of the step S31 is processing to determine whether or not the fourth change condition is satisfied.

If it is determined that the fourth change condition is satisfied, the coefficient $\alpha$ is changed (step S32). Specifically, the coefficient $\alpha$ is changed to the value larger than the present value $\alpha 1$. As described in the third change condition, during the execution of the following control, the coefficient $\alpha$ is set in accordance with the inter-vehicular distance LM. Therefore, when the coefficient $\alpha$ is changed, the changed value becomes larger than the present value $\alpha 1$ (i.e., $\alpha 1 \square \alpha 0$).

3.4 Advantageous Effects

According to the third embodiment described above, the second change processing is executed. In a situation where the third change condition is satisfied, it is desirable to be paid attention to the preceding vehicle M2. In this respect, according to the second change processing, the coefficient $\alpha$ is changed to the value larger than the default value $\alpha 0$ when the third change condition is satisfied. Then, as described in FIG. 10, the rotational speed $\omega$ set in the setting processing increases, and the movable mirror rotates at the higher speed. Therefore, it is possible to detect a change in the traveling state of the preceding vehicle M2 at an earlier timing. Therefore, it is possible to improve accuracy of the following control.

Also, in a situation where the fourth change condition is satisfied, the preceding vehicle M2 may tack or stop. Therefore, in such the situation, it is desirable to be paid more attention to the preceding vehicle M2 than in the situation where the third change condition is satisfied. In this respect, according to the second change processing, the coefficient $\alpha$ is changed to the value larger than the present value $\alpha 1$ when the fourth change condition is satisfied. Therefore, it is possible to detect the change in the traveling state of the preceding vehicle M2 due to an initiation of the decelerating travel at an earlier timing. Therefore, it is possible to improve the accuracy of the following control.

4. Fourth Embodiment

Next, a fourth embodiment will be described with reference to FIGS. 15 and 16. Explanation of the same configuration as that of the first to third embodiment will be omitted as appropriate.

4.1 Entire Configuration of Vehicle Control System

Figure 15:
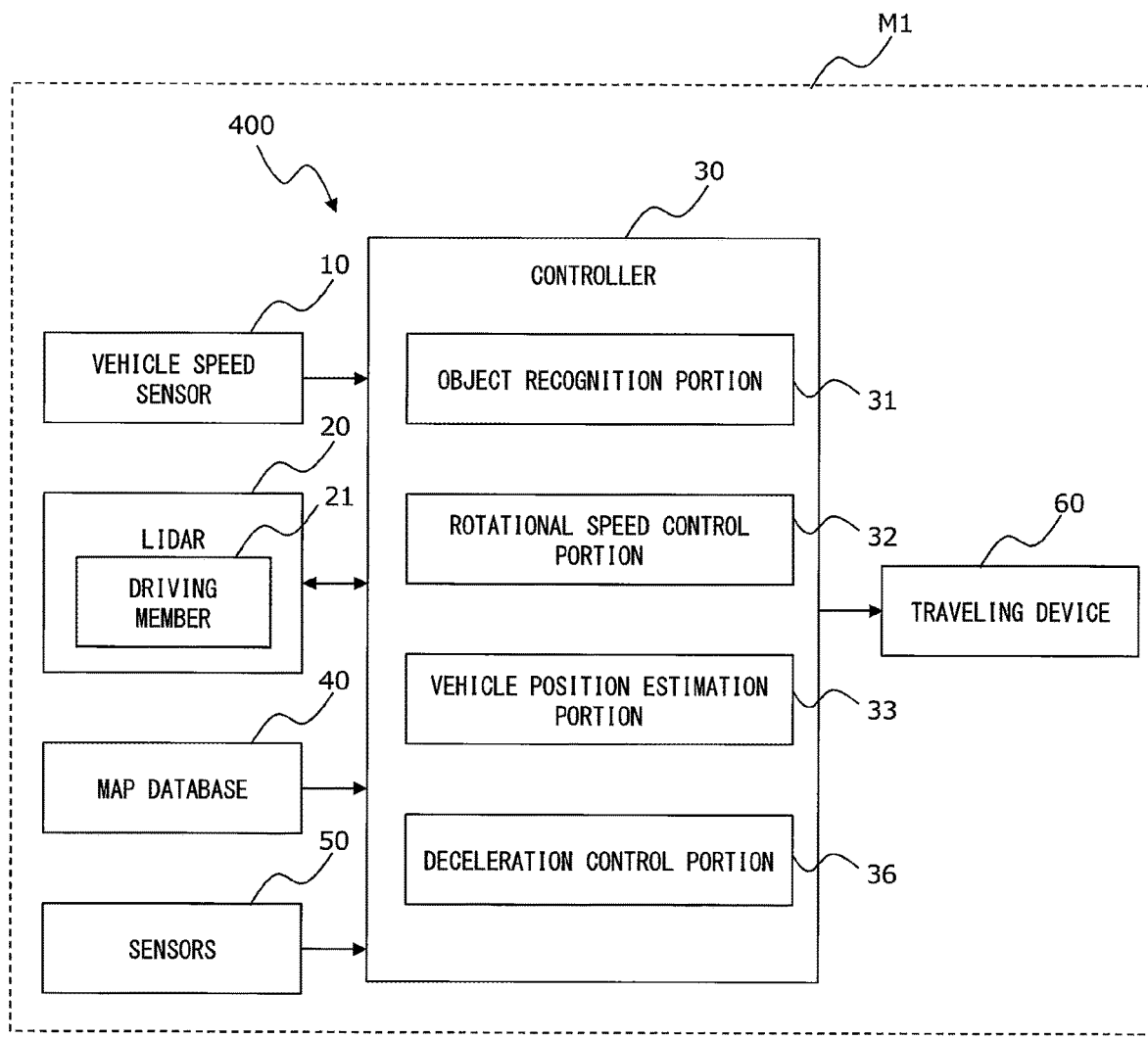
FIG. 15 is a diagram for explaining a configuration example of a vehicle control system according to a fourth embodiment.

FIG. 15 is a diagram for explaining a configuration example of the vehicle control system according to the fourth embodiment. The system 400 shown in FIG. 15 is mounted on the vehicle M1. The basic configuration of the system 400 is the same as that of the system 300 described in FIG. 11. The system 400 and the system 300 differ in the configuration of the controller 30.

4.2 Configuration of Controller

The configuration of the controller 30 will be described. As shown in FIG. 15, the controller 30 includes the object recognition portion 31, the rotational speed control portion 32, the vehicle position estimation portion 33, and a deceleration control portion 36. These function blocks are function blocks associated with the rotational speed control. These function blocks are realized when the processor of the controller 30 executes various types of control program stored in the memory.

The deceleration control portion 36 executes deceleration control of the vehicle M1 based on the information on the vehicle speed, the positional information of the vehicle M1 and the map information. The deceleration control is to decelerate the vehicle M1 by the operation of the brake device. The deceleration control will be described below.

4.3 Deceleration Control

The deceleration control is executed when the first or second change condition is met. These change conditions are as described in the items 2.3.1 and 2.3.2. The deceleration control may be executed until the vehicle M1 stops, or may be executed temporarily. For example, when the first change condition is satisfied, the deceleration control is executed until the vehicle M1 stops. When the second change condition is satisfied, the deceleration control is executed temporarily. When the deceleration control is executed, the vehicle speed is lowered. The lower the vehicle speed is, the faster the movable mirror rotates due to the execution of the setting processing. The setting processing is as described in the above first embodiment.

Figure 16:
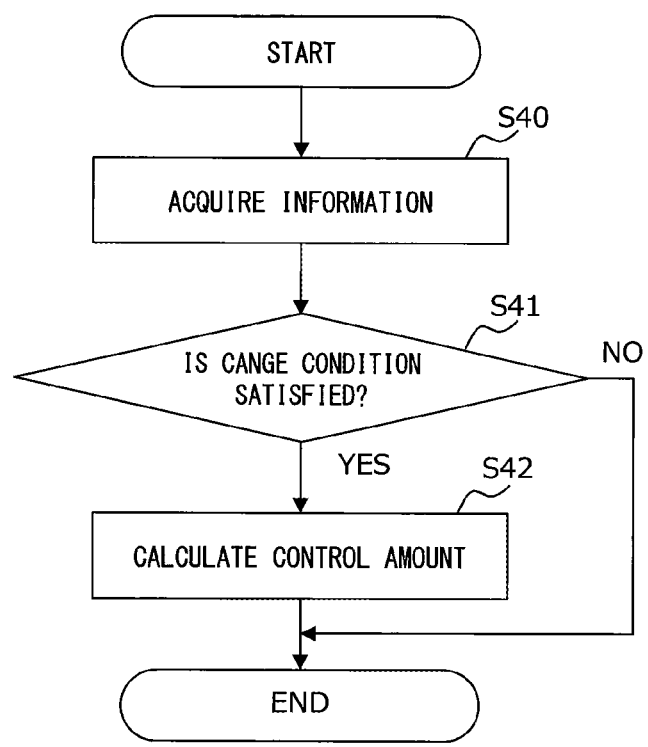
FIG. 16 is a flow chart for explaining a flow of processing to execute deceleration control by the controller.

FIG. 16 is a flow chart for explaining a flow of processing to execute the deceleration control by the controller 30. The processing routine shown in FIG. 16 is repeatedly executed at a predetermined control cycle while the vehicle M1 is traveling.

In the processing routine shown in FIG. 16, the processing of steps S40 and S41 is executed. The processing of these steps is the same as that of the steps S20 and S21 shown in FIG. 9.

If it is determined in the step S41 that the first or second change condition is satisfied, control amount of the brake device is calculated (step S42). In the processing of the step S42, the control amount is calculated in accordance with the change condition satisfied in the step S41. For example, if the first change condition is satisfied, the control amount is calculated such that the vehicle M1 stops in front of the stop line SL. If the second change condition are met, the control amount is calculated such that at least the vehicle speed is reduced.

4.4 Advantageous Effects

According to the fourth embodiment described above, the deceleration control is executed when the first or second change condition is satisfied. Therefore, it is possible to rotate the movable mirror at a high speed without changing the coefficient $\alpha$. Therefore, it is possible to obtain the same effects as when the first change processing described in the second embodiment is executed.

What is claimed is:

1. A vehicle control system, comprising:
   a vehicle speed sensor which is configured to acquire traveling speed of a vehicle;
   a LIDAR which is configured to acquire surrounding information of the vehicle using a laser beam, the LIDAR includes a movable mirror; and
   a controller which is configured to control a rotational movement of the movable mirror,
   wherein the controller is further configured to execute processing to set a cycle of the rotational movement based on the traveling speed such that the cycle of the rotational movement is longer at a faster speed than at a slower speed, wherein the slower speed is slower than the faster speed,
   wherein the controller is further configured to execute processing to set a rotational speed of the movable mirror based on the traveling speed such that the rotational speed of the movable mirror is slower at the faster speed than at the slower speed,
   wherein the controller sets the rotational speed of the movable mirror using the following expression (1):

$$\omega = \alpha \cdot \omega 1 + (1-\alpha) \cdot \omega 2 \quad (1)$$

wherein:
   $\omega$ is the rotational speed of the movable mirror;
   $\omega 1$ is an upper limit value of the rotational speed of the movable mirror;
   $\omega 2$ is a lower limit value of the rotational speed of the movable mirror;
   $\alpha$ is a coefficient;
   $\omega 1$ and $\omega 2$ are preset values corresponding to the traveling speed of the vehicle;
   the controller maintains the coefficient $\alpha$ when one of a first change condition and a second change condition is satisfied, and changes the coefficient $\alpha$ when one of a third change condition and a fourth change condition is satisfied;
   the first change condition is satisfied when a stop line on a pathway of the vehicle within a detecting region is detected;
   the second change condition is satisfied when a blocking object around an intersection on the pathway of the vehicle within the detecting region is detected;
   the third change condition is satisfied when the traveling speed of the vehicle is equal that of a preceding vehicle; and
   the fourth change condition is satisfied when the preceding vehicle decelerates,
   wherein the controller decelerates the vehicle when one of the first change condition and the second change condition is satisfied,
   wherein the controller changes the coefficient $\alpha$ to a first value larger than a default value when the third change condition is satisfied, and
   wherein the controller changes the coefficient $\alpha$ to a second value larger than the first value when the fourth change condition is satisfied.

2. The vehicle control system according to claim 1, further comprising:
   a GPS receiver which is configured to acquire positional information of the vehicle; and
   a map database is configured to store map information,
   wherein the controller is further configured to:
   determine, based on the traveling speed and the positional and map information, whether or not the first change condition is satisfied.

3. The vehicle control system according to claim 1, further comprising:
   a GPS receiver which is configured to acquire positional information of the vehicle; and
   a map database is configured to store map information,
   wherein the controller is further configured to:
   determine, based on the traveling speed and the positional and map information, whether or not the second change condition is satisfied, the second change condition is satisfied when the blocking object blocks the laser beam located around the intersection.

4. The vehicle control system according to claim 1, further comprising an external sensor configured to acquire the surrounding information,
   wherein the controller is further configured to:
   execute, based on information on preceding vehicle data which is included in the surrounding information, following control to follow traveling of the preceding vehicle;
   determine, under a condition where an inter-vehicular distance is maintained, whether or not the following control is executed; and
   when it is determined that the following control is executed under the condition, set the cycle shorter in the setting processing as compared with a case where it is determined that the following control is not executed under the condition.

5. The vehicle control system according to claim 4, wherein the controller is further configured to:

determine, based on the information on the preceding vehicle, whether or not the preceding vehicle has started decelerating travel during the execution of the following control; and when it is determined that the preceding vehicle has started the decelerating travel, set the cycle shorter in the setting processing as compared with a case where it is determined that the preceding vehicle has not started the decelerating travel.

* * * * *